INVENTOR.
OSKAR DORFMANN

May 24, 1960 O. DORFMANN 2,937,578
BOX BLANK FOLDING MACHINE
Filed Oct. 7, 1957 11 Sheets-Sheet 8

INVENTOR.
OSKAR DORFMANN
BY
ATTORNEYS

May 24, 1960 O. DORFMANN 2,937,578
BOX BLANK FOLDING MACHINE
Filed Oct. 7, 1957 11 Sheets-Sheet 9

INVENTOR.
OSKAR DORFMANN
BY
Darby & Darby
ATTORNEYS

United States Patent Office
2,937,578
Patented May 24, 1960

2,937,578

BOX BLANK FOLDING MACHINE

Oskar Dorfmann, North Bergen, N.J., assignor to Federal Carton Corporation, a corporation of New York Filed Oct. 7, 1957, Ser. No. 688,540

19 Claims. (Cl. 93—49)

This invention comprises a fully automatic machine by means of which individual previously cut box blanks are folded and set up in final form on each stroke of the machine.

The general object of the invention is to provide an improved form of machine of this type, including a mechanism for delivering the box blanks to the forming mechanism of the machine one at a time, and after they are folded to final form, automatically ejecting them from the machine.

There are many additional detailed objects of the invention which will have clearer meaning in the following description of the embodiment of the machine illustrated in the drawings, as the preferred form of mechanism embodying the principles of this invention.

In the accompanying drawings.

It is first noted that the mechanism herein disclosed is a greatly revised and improved machine employing some of the principles of my copending application Serial No. 511,071, filed May 25, 1955, now U.S. Patent No. 2,863,- 370, for Box Forming Machine.

The box blank and resulting box illustrated in Figs. 15 to 18 inclusive is the subject matter of the copending application of Frank McCormick, Serial No. 647,025 filed March 19, 1957 for Carton.

The manner of operation of the machine and the function of the various parts thereof will be more easily understood if explained in connection with the box blank and the box formed therefrom. For that reason the blank and box will first be described in connection with Figs. 15 to 18 inclusive.

Figures 15, 16:
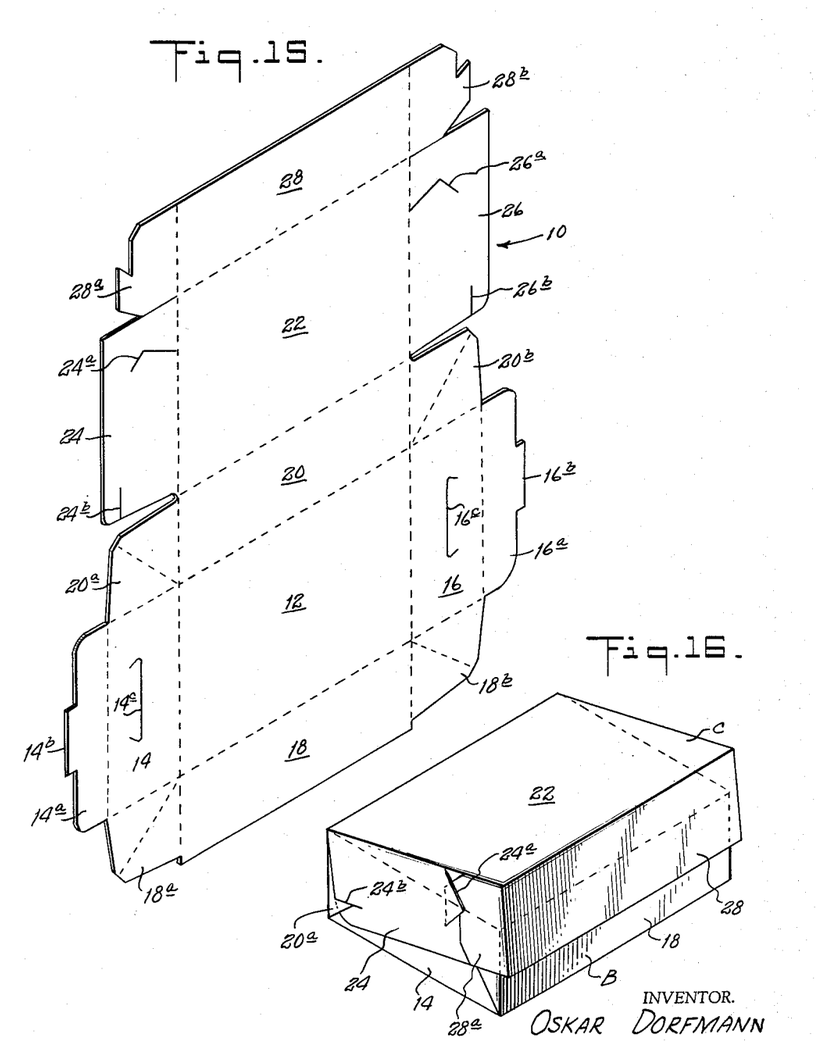
Figure 15 is a perspective view of the preformed box blank which is set up by the mechanism of the preceding figure.
Figure 16 is a perspective view of the finished box formed from that blank.

The box blank, which is generally indicated at 10 in Fig. 15, is cut from a sheet of suitable fibrous material and from it a box is formed by the machine to provide a container which has an imperforate bottom and corners.

The blank 10 comprises the form illustrated in Fig. 15, in which the dotted lines indicate score or fold lines. These lines define the bottom wall 12 of the box body B having end wall extensions 14 and 16. The end walls 14 and 16 are terminated by tab extensions 14$^a$ and 16$^a$ respectively, which in turn have central tabs 14$^b$ and 16$^b$ respectively. The remaining pair of sides of the bottom wall 12 have integral extensions 18 and 20 defining the front and back walls of the bottom B of the box. The adjacent ends of the end walls and front walls of the bottom of the box are connected by integral, generally rectangular sections 18$^a$, 18$^b$, 20$^a$ and 20$^b$, their configuration being completed by fold lines, as indicated in Fig. 15. Each of these sections is provided with a diagonal fold line, as shown, for a purpose which will appear later. The ends walls 14 and 16 are provided with cut or slit lines 14$^c$ and 16$^c$ for a purpose to be later described.

Integral with and extending beyond the rear wall 20 is the top wall 22 of the cover C. This wall is provided with end extensions 24 and 26 which are provided with cuts or slits 24$^a$ and 24$^b$, and 26$^a$ and 26$^b$ respectively, the function of which will be later described. In turn the top wall 22 is provided with an integral extension 28 which forms the front wall of the cover C and which has at its ends integral extensions 28$^a$ and 28$^b$ defined by fold lines and having hook shaped configurations at their end defining edges.

Figure 17:
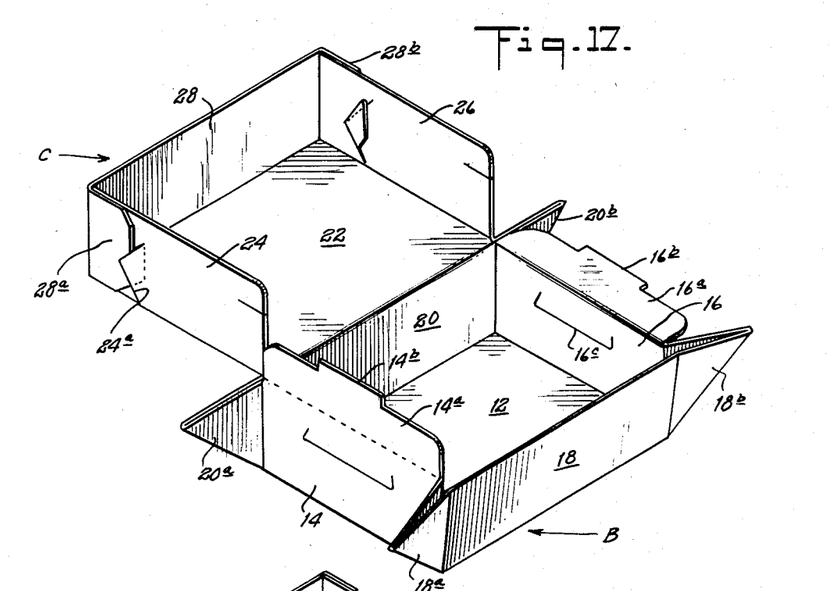
Figure 17 is a perspective view of the box blank partially formed into a box.
Figure 18:
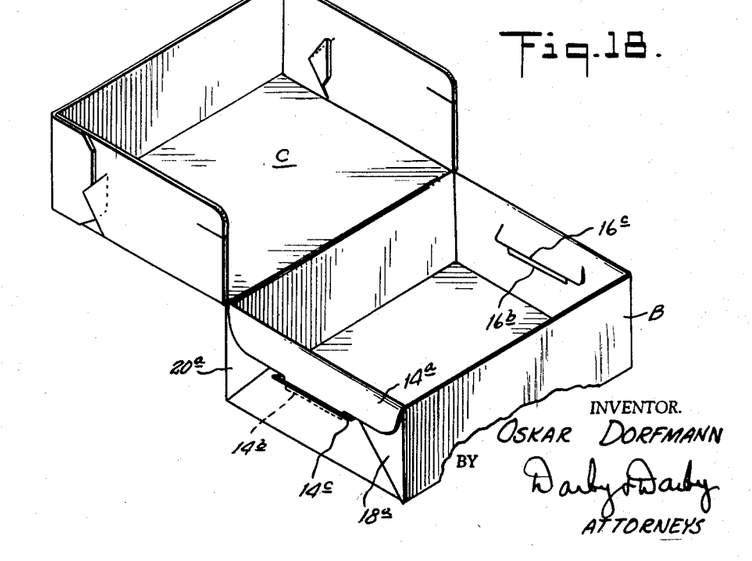
Figure 18 is a perspective view of the completed box showing it open.

As illustrated in Fig. 17, the end walls 14 and 16 and the front and back walls 18 and 20 of the box body C, are folded by the machine into rectilinear relation with each other and with the bottom wall 12. As this condition is brought about the sections 18$^a$ and 18$^b$, 20$^a$ and 20$^b$ are folded along their diagonal fold lines to form triangular tabs as clearly illustrated in Fig. 17. The machine then folds these tabs into a position to overlie the adjacent end walls 14 and 16, see Fig. 18, and the associated end wall extensions 14$^a$ and 14$^c$ are folded outwardly and downwardly to overlie the triangular corner reinforcements. The associated terminal tabs 14$^b$ and 16$^b$ are then snapped into the associated slits 14$^c$ and 16$^c$ to lock the end wall parts in final position, as illustrated in Fig. 18.

The cover C is formed by folding the front wall 28 and the end walls 24 and 26 of the cover into rectilinear relation with each other and the coverwall 22, after which the extensions 28$^a$ and 28$^b$ of the front wall of the cover are folded around into contact with the end walls 24 and 26. Their hooked ends are inserted in the slits 24$^a$ and 26$^a$ as the parts are brought into this relation, whereupon they are locked in that relation, as illustrated in Fig. 17. The slits 24$^b$ and 26$^b$ on the end walls of the cover C are positioned so that when the box is closed, as illustrated in Fig. 16, the triangular reinforcements 20ᵃ and 20ᵇ interengage therein to aid in holding the box completely closed and the end walls of the cover from displacement outwardly of the associated end walls of the box body B.

The operations described above are all performed automatically by the machine, which will now be described. In addition to performing these operations this machine is equipped to supply the box blanks 10 one at a time for setting up and to eject the completed boxes from the machine, in the form illustrated in Fig. 18.

Figure 1:
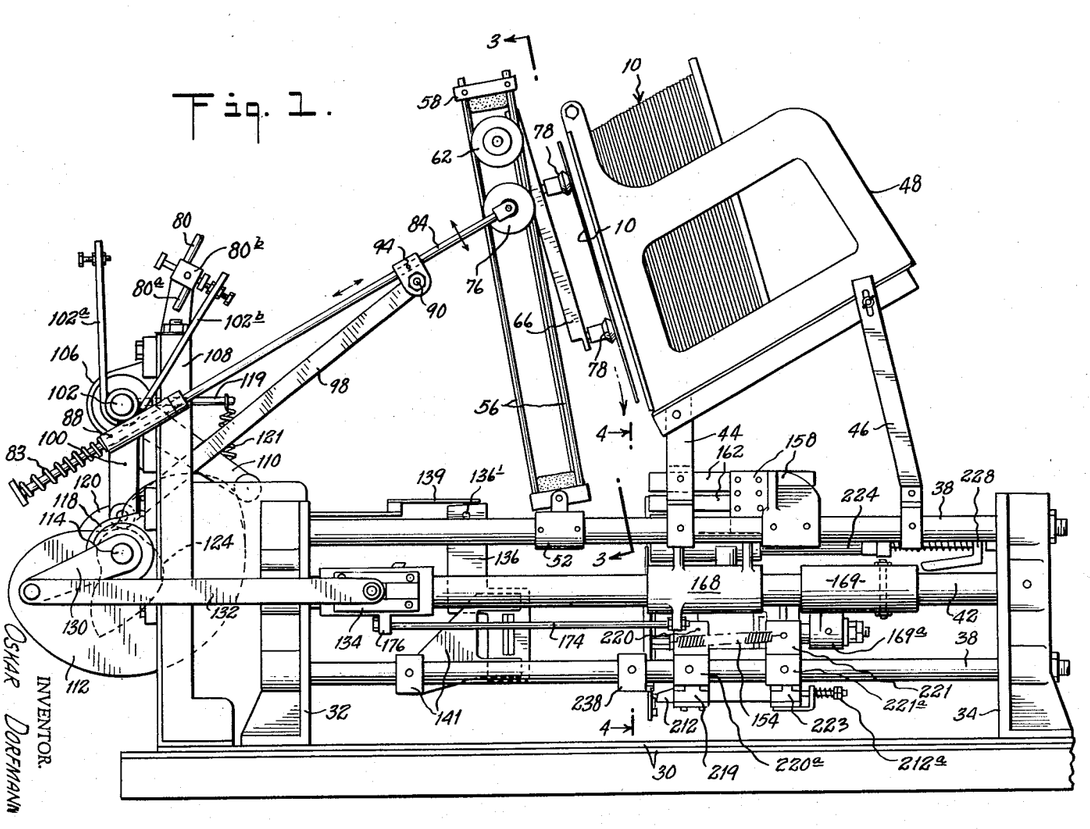
Figure 1 is a side elevational view of the machine.
Figure 2:
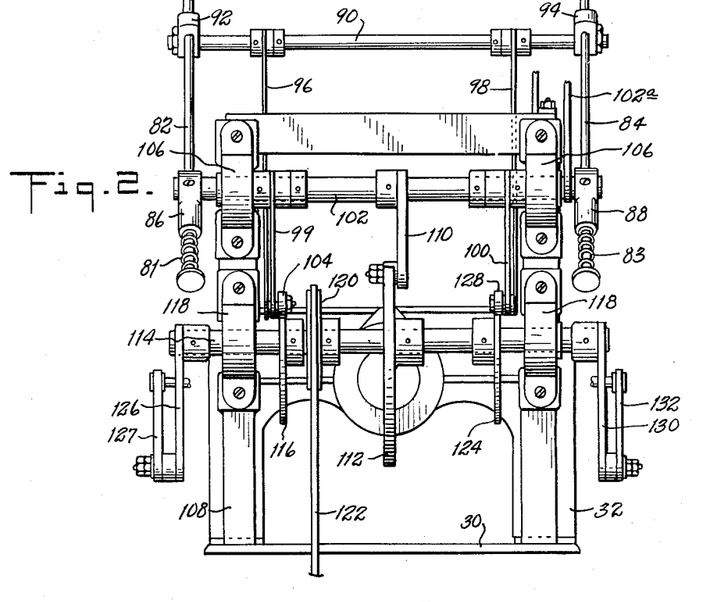
Figure 2 is a lefthand end elevational view thereof.
Figure 4:
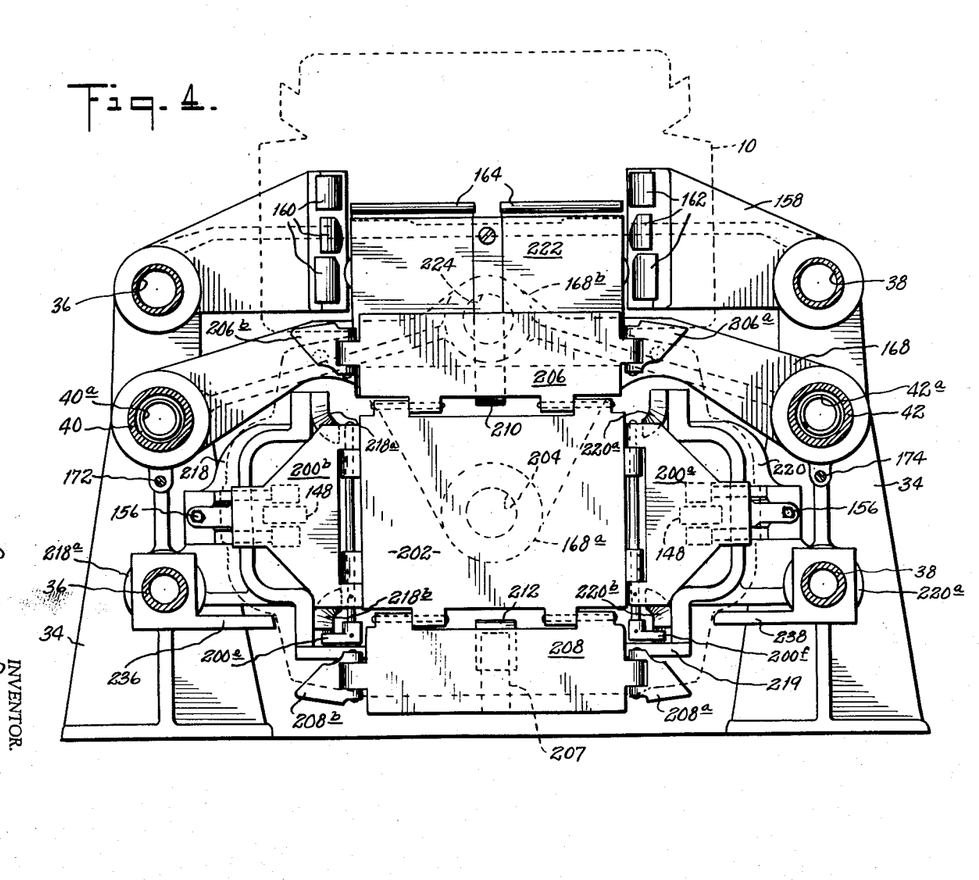
Figure 4 is a cross-sectional view taken on the line 4—4 of Figure 1.

The general assembly of the box forming machines is illustrated in detail in Figs. 1 and 2. It includes a baseplate 30, which has secured thereon in upstanding relation at opposite ends the frames 32 and 34. These frames are parallel to each other and are interconnected by a series of tubes which form guide rails. As shown in Fig. 4, the tubes 30 are at one side of the machine and the tubes 38 are at the other side. All of these tubes lie in parallel relation and permanently connect the end frames 32 and 34 together. Also extending between these frames, centrally of the tubes 36 and 38, is an additional pair of tubes 40 and 42, also providing guideways for parts of the mechanism, as will be described later.

Figure 3:
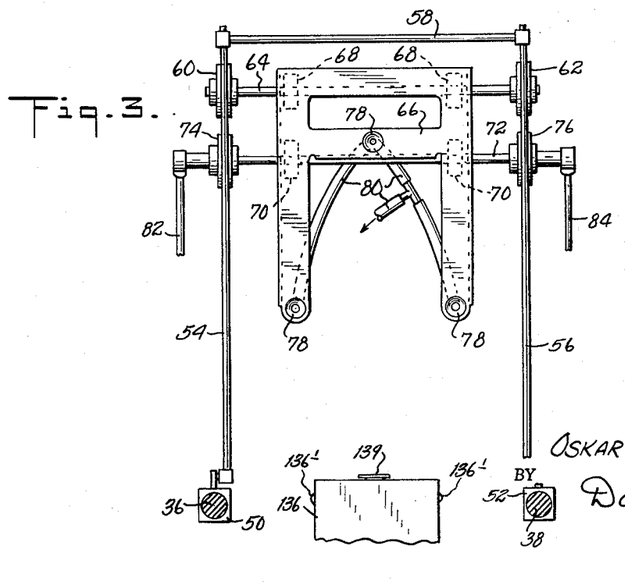
Figure 3 is a detailed view of a portion of the blank feeding mechanism as it appears from the plane 3—3 of Figure 1.

Supported in longitudinally spaced relation on the top rails 36 and 38 are pairs of upstanding brackets 44 and 46, see Fig. 1, which comprise a support for a feed hopper 48 into which a number of the box blanks 10 can be stacked on end. Secured to the top rails 36 and 38 are the fixtures 50 and 52, see Figs. 1 and 3, on which are pivotally mounted pairs of parallel rods 54 and 56 which are secured together by a cross member 58 at the top so that the rod pairs lie parallel to each other. The rail pairs 54 and 56 provide guideways for grooved rollers 60 and 62 and 74 and 76. The rollers 60 and 62 are rotatably mounted on a connecting shaft 64 and the rollers 74 and 76 are rotatably mounted on connecting shaft 72. Pivotally mounted on the shafts 64 and 72, by means of the bearing fixtures 68 and 70, is a plate-like member 66. The plate 66 serves as a support for a series of flexible rubber suction cups 78 which are connected by a tubing system 80 to a valving arrangement to be described later.

A pair of rods 82 and 84, see Fig. 2, are cross-connected by a shaft 90 through the agency of a pair of fixtures 92 and 94. The upper ends of the rods 82 and 84 are pivotally connected to the ends of the shaft 72, see Fig. 3. At the opposite ends the rods 82 and 84 have a sliding fit in sleeve-like fixtures 86 and 88, which are secured to the ends of a shaft 102. The ends of these rods are provided with stops and between these stops and the ends of the associated sleeves are the compression springs 81 and 83. A pair of links 96 and 98 are pivotally connected to the shaft 90 at one end and pivotally connected at their other ends to the lower ends of a pair of levers 90 and 100. These latter levers are pivoted at their other ends on the shaft 102. At the points of pivotal connection between the lever pairs 96 and 99 and 98 and 100 are the cam rollers 104 and 128.

The shaft 102 is journaled in a pair of bearings 106 supported on the end frame 108 mounted on the outside of the standard 32, see Fig. 1. Secured to the longitudinal center of shaft 102 is a lever 110 having a cam roller on its free end cooperating with the cam 112 mounted on a shaft 114. Shaft 114 is journaled in a pair of bearings 118 also mounted on the end frame 108. Secured to the shaft 114 in alignment with the cam rollers 104 and 128 are the cams 116 and 124. Also secured on shaft 114 is a drive pulley 120 which is driven from any suitable power source, such as a motor, by means of the drive belt 122.

Referring to Fig. 1, there is shown a lever 119 secured to the shaft 102 and urged by a spring 121 in a clockwise direction, the lower end of that spring being anchored to the same fixed part of the machine. This spring will hold the cam roller of lever 110 in engagement with the cam 112. Also secured to the shaft 102 are a pair of levers 102ᵃ and 102ᵇ, see Fig. 1, which are positioned to alternately actuate a valve 80ᵇ which connects a suitable source of vacuum, not shown, by means of the pipe 80ᵃ to the connections 80 for the suction cups 78. The valve 80ᵇ is mounted on the upper end of the frame 108, as shown.

Figure 5:
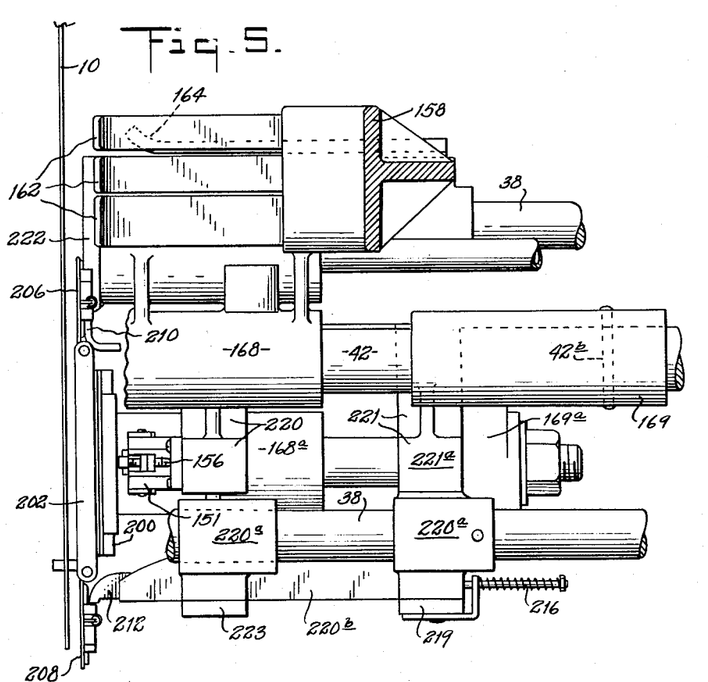
Figure 5 is a detailed elevational view of the box body and cover forming part of the machine shown in operative relation to the reciprocable forming ram showing some parts broken away and some parts in cross-section.
Figure 7:
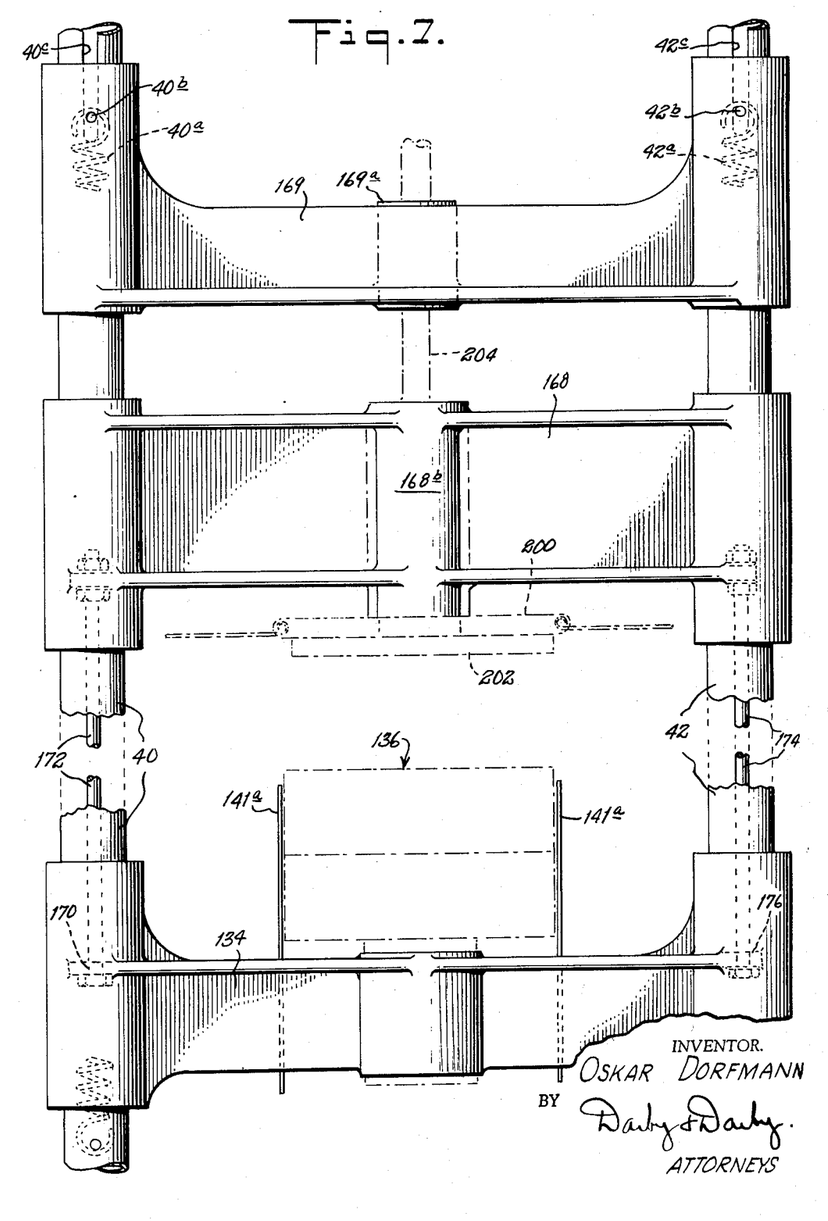
Figure 7 is an enlarged detailed plan view of the mechanism of Figure 5 with the ram omitted.

On the ends of the shaft 114 are a pair of crank arms 126 and 130 which are respectively pivotally connected by the links 127 and 132 to the opposite sides of a cross head 134 on which the box forming ram 136 is mounted, see Figs. 1, 5 and 7.

The ram is shown in elevation in Fig. 5, and consists of two longitudinally offset but integral sections 136ᵃ and 136ᵇ, the cross-sectional shape and dimensions of which are the same as the shape and dimensions of the insides of the box body B and the box cover C, in a manner which is obvious in view of the construction of the box. Extending from the standard 32 towards the ram 136, so as to slide along the top edge thereof, is a stripper finger 139. Similarly, pairs of strippers fingers 141ᵃ and 141ᵇ are supported by a frame 141 from the bottom rails 36 and 38, so as to engage the opposite sides of the box body forming portion 136ᵃ or the ram. The action of these stripper fingers will be described later. The cover forming section 136ᵇ of the ram is provided with a pair of hemispherical dimples 136' on the opposite side faces thereof for a purpose to be described later.

Figures 8, 9:
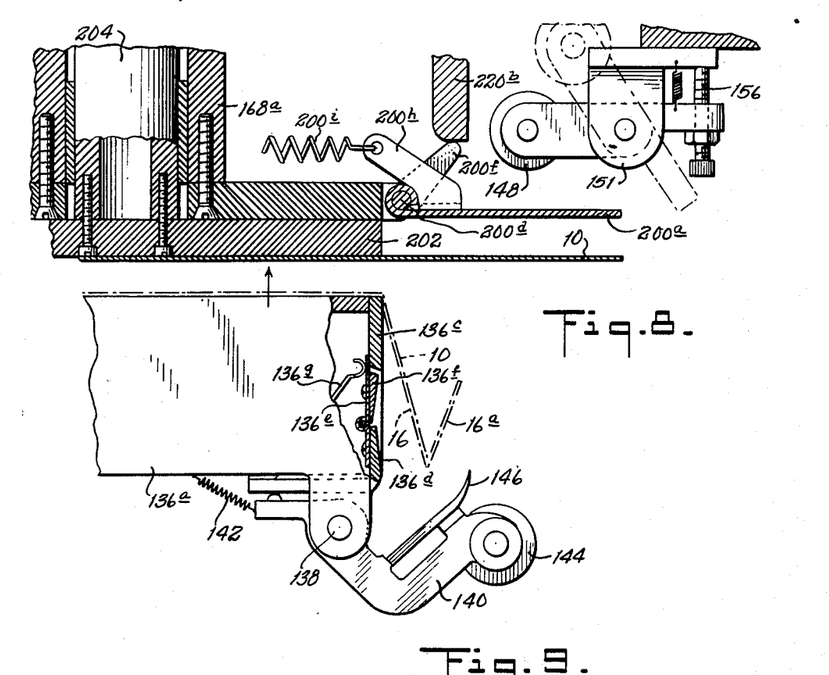
Figure 8 is a detailed, cross-sectional view showing a portion of the forming platen for the box body and the related portion of the forming ram with the associated mechanism illustrating particularly the manner in which the box ends are formed.
Figure 9 is a view corresponding to Figure 8, showing the ram portion of that figure in a different relative position illustrating how the locking tabs on the end walls are snapped into locking position.

Referring to Figs. 8 and 9 it will be seen that the rear face of the lower portion 136ᵃ of the ram is provided with extensions on which are pivotally mounted at 138 the bell crank levers 140. Mounted on the ends of the bell crank levers 140 are the rollers 144 and the fingers 146. The opposite ends of the levers are influenced by tension springs 142 so to be normally held in the position shown in Fig. 8 when unrestrained.

Mounted on a fixed adjacent portion of the machine, see Figs. 4 and 5, are brackets 151 on which are pivoted at 152 the double ended levers 150. These levers are provided with adjusting stop screws 156 and tension springs 154 to normally hold them in the position shown in Figs. 8 and 9. The opposite ends of the levers 150 are provided with rollers 148. The relative positions of the rollers 148 with respect to the rollers 144 is such that on the return stroke of the ram, that is from the top of the sheet of Figs. 8 and 9 towards the bottom, the bell crank levers 140 will be rotated in a counterclockwise direction from the position shown in Fig. 8 to the position shown in Fig. 9 for a purpose to be described.

On the opposite stroke, that is on movement of the ram in box forming direction from the bottom towards the top of the sheet, the rollers 144 engage the rollers 148, rotating the levers 150 to the dotted position shown in Fig. 8, so that the bell crank levers are not disturbed from the position shown in Fig. 8 during this movement. It is to be understood that an assembly including the roller 148 will be mounted on opposite sides of the ram to operate the other bell crank lever 140 referred to, but not shown, except in Fig. 4. The adjacent side walls of the section 136ᵃ of the ram are composed of two parts 136ᶜ and 136ᵈ, which are spaced to form a gap in which is mounted a hinged door 136ᶠ. This door is supported by a hinge 136ᵉ and is engaged by a leaf spring 136ᵍ so as to be normally held in the position shown in Fig. 8. When the bell crank lever 140 is rotated, on the return stroke of the ram, to the position shown in Fig. 9, its associated finger 146 will move to the position shown in Fig. 9, opening the door 136ᶠ against the resistance of spring 136ᵍ for a purpose to be described later.

At 158, see Figs. 1 and 4, is a cross frame which is mounted on the tubes 36 and 38 and fixed thereto. This cross frame is shaped to receive a series of vertically arranged sets of cam fingers 160 and 162 on opposite sides of the centerline of the machine, see also Fig. 5. Lying between these fingers in a horizontal plane are a pair of spring fingers 164, see also Fig. 6.

Figure 6:
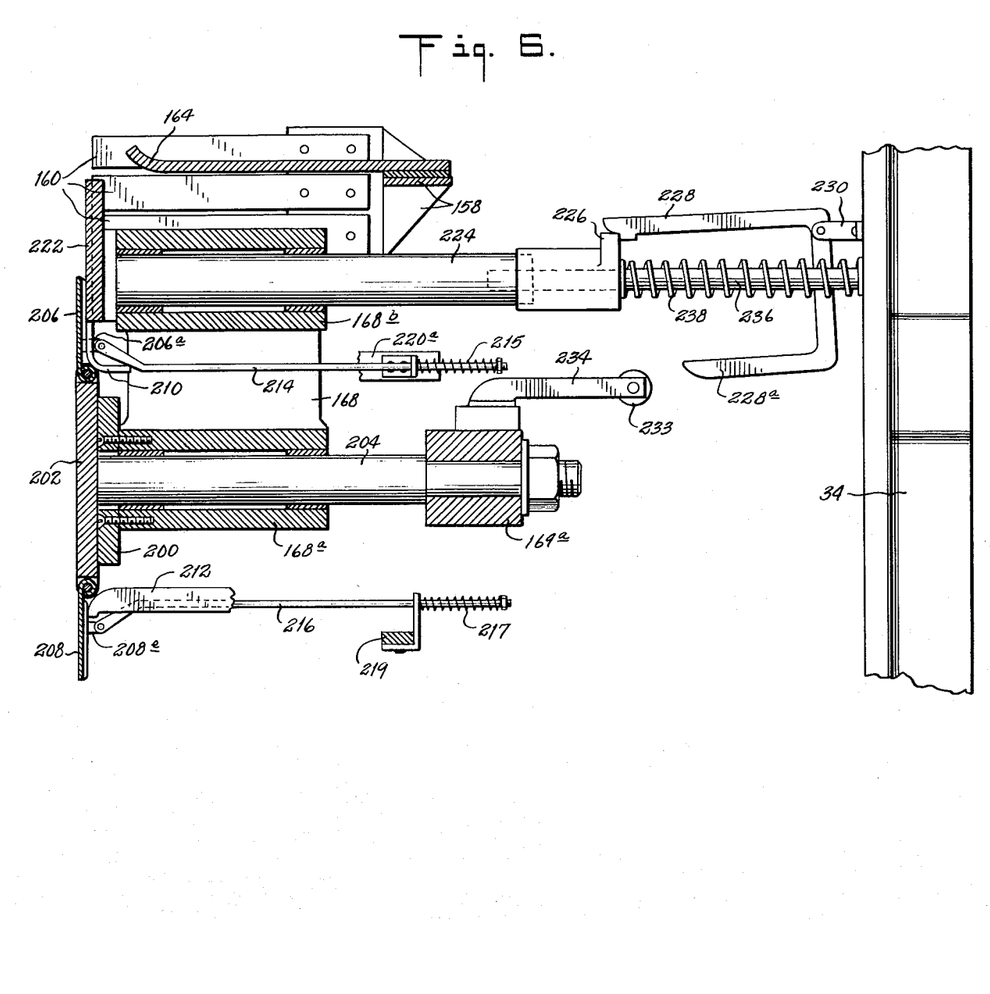
Figure 6 is a vertical, central, cross-sectional view of the mechanism of Figure 5 with the ram omitted.

At 168, see particularly Figs. 4, 5 and 6, is a cross slide which can be in the form of a casting which is slidably mounted on the tubes 40 and 42. This casting is provided with a pair of vertically spaced hubs or sleeves 168$^a$ and 168$^b$. As indicated in Figs. 1 and 7, the ram slide 134 is provided with a pair of depending ears 170 and 176 in which are slidably mounted a pair of rods 172 and 174. These rods are connected to corresponding ears on the underside and at the opposite ends of the cross slide 168, see Figs. 1 and 4.

On the ram side of the hub 168$^a$ is secured a plate 200, see for example Fig. 6. Slidably mounted in the hub is a shaft 204 on one end of which is a plate 202 which is positioned in front of the plate 200. The other end of the shaft 204 is bolted onto hub 169$^a$ on the cross brace 169, which is slidably mounted on the tubes 40 and 42. The sleeves at the end of the cross brace 169, see Fig. 7, are provided with diametral pins 40$^b$ and 42$^b$ which pass through slots 40$^c$ and 42$^c$ in the tubes 40 and 42. Anchored at one end on these pins are tension springs 40$^a$ and 42$^a$, which extend along inside the tubes, see also Fig. 1, which springs are anchored at their other ends in the tubes, as indicated in Fig. 7. Other suitable and functionally equivalent means can be used in place of springs 40$^a$ and 42$^a$.

Figure 10:
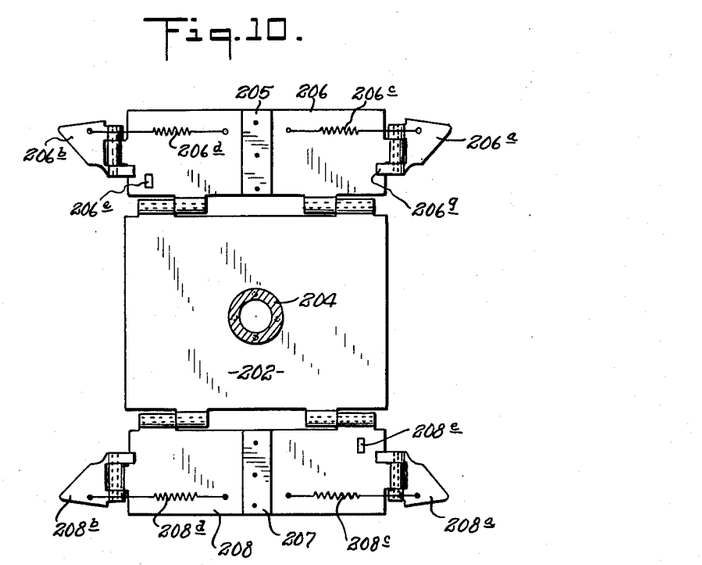
Figure 10 is a rear elevational view of a portion of the box body forming platen.

Referring to Fig. 10, it will be seen that the plate 202 has pivotally mounted on the top and bottom edges the flaps 206 and 208 respectively which have mounted on their rear faces the cam plates 205 and 207. It will be understood that the structure in Fig. 10 is viewed from the righthand side from the rear face, see Fig. 6.

Pivotally mounted on the ends of the flap 206 are the extensions 206$^a$ and 206$^b$, which are respectively connected to tension springs 206$^c$ and 206$^d$, which springs are anchored on the flap 206. Similarly, the flap 208 has pivoted extensions 208$^a$ and 208$^b$, which are biased by means of the tension springs 208$^c$ and 208$^d$, respectively. Each of the pivoted extensions is provided with an ear 206$^g$, as in the case of the extension 206$^a$, which prevents the associated springs, that is the spring 206$^c$ in this case, from moving the extension back beyond the plane of the flap 206.

The plate 200 is provided with flaps 200$^a$ and 200$^b$ at its ends, which are pivotally mounted thereon by means of a pivot pin 200$^c$ and 200$^d$, respectively. These flaps are provided with lugs 200$^g$ and 200$^h$, respectively, connected by means of a tension spring 200$^i$. At the lower end of the pivot pins 200$^c$ and 200$^d$ are cam actuators 200$^e$ and 200$^f$, respectively. As is clear from Fig. 1, when the plates 200 and 202 are in position in the machine, as shown in Fig. 6, the flaps 206, 208, 200$^a$ and 200$^b$ lie on the periphery of a rectangle and provide a platen folding assembly, the operation of which will be described later.

As shown in Figs. 4, 5 and 6, there is mounted on the hub 168$^b$ on the cross slide 168, a plate 222. This plate is supported on the front of the hub 168$^b$, so as to lie in back of the flap 206 and has mounted in a groove on the front face thereof a cam 210 which coacts with the cam plate 205 of the flap 206. Supported from the bottom tubes 36 and 38 on a suitable fixture is the cam 212, see Fig. 4, which cooperates with the cam plate 207 on the flap 208 for a purpose to be described later.

Extending rearwardly from the hub 168$^b$ is a shaft 224 having a counterbore in the free end thereof in which a rod 236 fixed on the frame member 34, see Fig. 6, can slide axially. Secured on the end of the shaft 224 is a fixture having a stop lug 226 which cooperates with the latching end 228 of a U-shaped member pivotally mounted in a fixture 230 on the bracket 34. This U-shaped member has a cam follower extension 228$^a$ which cooperates with a cam roller 233 rotatably mounted on the end of an arm 234 mounted on the slide 169. Any suitable resilient means, such as a compression spring 238 surrounding the fixed rod 236 and lying between the frame member 34 and the end of the fixture on which is mounted the stop 226, is used to resist movement of the plate 222 when released by the latch member 228.

Figure 6A:
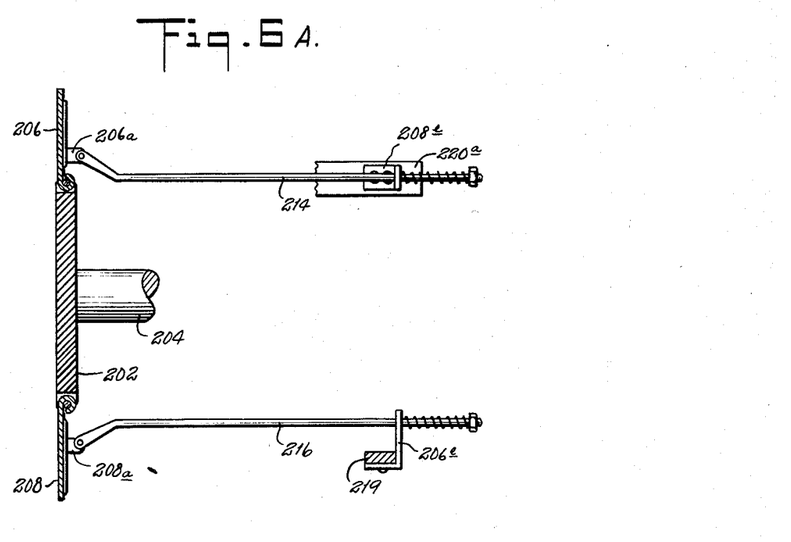
Figures 6A and 6B are detailed views showing construction details.

As illustrated in Fig. 6 the flaps 206 and 208 have lugs 206$^a$ and 208$^a$ to which are pivotally connected a pair of rods 214 and 216 which have a sliding fit in apertures in the brackets 206$^e$ and 208$^e$, and are provided with compression springs 215 and 217 which act when the platen assembly is in inactive position to hold the flaps 206 and 208 in the plane of the plate 202 on which they are pivotally mounted. The bracket 206$^e$ is supported by bar 219 and bracket 208$^e$ is mounted on cam 220$^a$, see Figs. 6A and 6B.

Figure 6B:
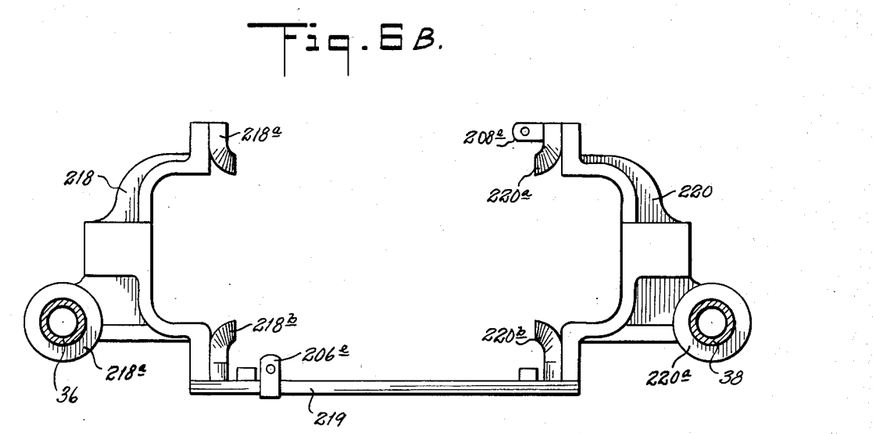

As shown in Figs. 1, 4 and 6B, there are mounted on the tube 38 a pair of generally U-shaped brackets 220 and 221 by means of integral collars 220$^a$ and 221$^a$. Mounted on the other side of the machine on the tube 36, are a similar pair of brackets of which pair only the front bracket 218 appears in the drawing. As illustrated in Fig. 6B, bracket 218 is cross-connected with bracket 220 by means of the bar 219. Similarly, the rear pair of brackets which includes the bracket 221, are cross-connected by a bar 223, see Fig. 1, corresponding to the bar 219. These bracket pairs are provided with seats for the fixed cams 218$^a$, 218$^b$, 220$^a$ and 220$^b$, the function of which will be explained in detail later. These pairs of brackets are fixed to the bars 36 and 38 by their integral collars, as illustrated in the case of the collars 218$^a$ and 220$^a$, Fig. 6B. At this point it will be noted, as illustrated in Fig. 1, that the fixed cam 212 is mounted on the cross-bars 219 and 223, and is provided with means for adjusting its longitudinal position, as diagrammatically illustrated at 212$^a$.

As illustrated in Figs. 1 and 4, there are mounted on the tubes 36 and 38 a pair of carton blank stops 236 and 238 onto which the feeding mechanism delivers the blanks one at a time to hold them in the position clearly illustrated in Fig. 4 by the dotted outline of the blank 10.

In the operation of the machine it will be assumed first that the hopper 48 is loaded with precut blanks 10, like the blank shown in Fig. 15, and that cam 112 is in a position where the lever 110 is in its most counterclockwise position, see Fig. 1. Under these conditions the rods 82 and 84 will be in the highest position and the frame comprising the rod pairs 54 and 56 will be tipped back away from the hopper the maximum distance. With the motor operating the shaft 114, cam 112 will be revolving and as the follower on the lever 110 moves down to the low point of the cam, the shaft 102 will move in a clockwise direction, causing the fixtures 86 and 88 secured thereto to rotate with it, with the result that the rods 82 and 84 will swing downwardly in a clockwise direction. As these rods move down the roller sets 60, 62 and 70, 76 will move down on the rods 54 and 56 carrying the support 66 for the suction cups 78 with them. As these cups move down to a proper position opposite the foremost blank 10 in the hopper, the cams 116 and 124 operating the follower rollers 104 and 128 will move the links 96 and 98 forwardly, that is towards the hopper, carrying the rods 82 and 84 forward, so that as the suction cups move down to active position, they will be moving forwardly into engagement with the foremost blank 10. The rods 82 and 84 acting through the rollers 74 and 76 on the rods 54 and 56, will tip the assembly of which they are a part on its pivotal support on the brackets 50 and 52. The result of all of this is that the suction cups move down into position and forwardly into engagement with the foremost blank 10. By the time they reach the end of this movement, shaft 102 will have been rotated to a point where the adjustable actuating screw on the lever 102$^b$ engages the operator of the valve 80$^b$ connecting the pipe 80 with the vacuum source through the line 80ª. Thus, suction is applied to the cups 78 and the foremost blank box attached thereto.

The cams 116 and 124 are so shaped that the tiltable assembly, including rods 54 and 56, will tip back a bit to carry the picked up blank 10 to and through the position shown in Fig. 1, away from the stack. At the same time the shape of the cam 112 is such that its continued rotation will cause further clockwise rotation of the lever 110, and hence continue clockwise rotation of the rods 82 and 84 downwardly towards the base of the machine. By the time the carrier for the suction cups has moved to its lowermost position the blank 10 will be deposited on the stops 236 and 238, as shown in dotted lines in Fig. 4. At this time the lever 102ª will have actuated the valve 80ᵇ to cut off the suction cups 78 from the source so that the blank is released and the suction cups can return to initial position, leaving the blank on the stops.

During this feeding operation shaft 114 is revolving, causing cranks 126 and 130 to advance the ram carrying carriage 134 to the right, Fig. 1, towards the blank so that at the time the blank is released, the box body forming portion 136ª of the ram will move into contact with the blank and hold it against the plate 202. It will be recalled that the peripheral shape and dimensions of the portion 136ª of the ram with the necessary clearance is the same as the internal dimensions of the box body B, and the face of this portion of the platen will engage the blank substantially over the area 12 comprising the bottom of the box. As the ram advances the blank is clamped in this position and starts to press on the platen assembly which is mounted on the slidable carriage 168. At this time, because of the fact that the upper portion 136ᵇ of the platen is offset to the rear of the portion 136ª, it will not engage the blank. The pressure of the ram on the platen assembly will cause it to slide to the right, Fig. 1. As this sliding movement occurs the cam plates 205 and 207 on the flaps 206 and 208 on the plate 202 engage the fixed cams 210 and 212, causing these flaps to begin to hinge outwardly into rectilinear relation with the plate 202. At the same time the flaps 200ª and 200ᵇ are moved outwardly into rectilinear relation with the plate 200 by reason of the engagement of the cams 200ᵉ and 200ᶠ on the pivot pins of these flaps with the sides of the fixed cams 218ᵇ and 220ᵇ.

Thus, as the platen assembly moves, under the pressure of the ram, the end and side walls 14 and 16 and 18 and 20 of the blank are bent up in rectilinear relation to the bottom wall 12 of the box, because the flaps 206, 208, 200ª and 200ᵇ are closed in around the platen. As these walls of the carton move into this relationship the generally rectangular areas 20ª, 20ᵇ, 18ª and 18ᵇ of the blank are folded to the shape shown in Fig. 17.

At this time it will be understood that the extensions 14ª and 16ª on the end walls of the box remain flat.

After these flaps have assumed rectangular relation with respect to their supporting plates, further movement of the platen assembly to the right, Fig. 1, will cause the hinge extension 206ª, 206ᵇ and 208ª and 208ᵇ to fold around at right angles to the planes of the flaps on which they are mounted by reason of their engagement with the fixed cams 218ª, 218ᵇ, 220ª, 220ᵇ. The infolding of these hinge extensions causes the triangular corner reinforcements on the box to be folded in from the position shown in Fig. 17 into contact with the outer faces of the adjacent end walls to the position shown in Fig. 18. Thus the platen assembly comprises a female die part which shapes the box body forming part of the blank around the part 136ª of the ram, which is the male die part.

This operation is occurring partly during the time when the cover of the box is being shaped up. This operation begins by the time the platen assembly, including plates 200 and 202, has moved back with respect to the fixed plate 222 mounted on the cross brace 158. In other words, by the time the end, front and back walls of the body of the box have been formed to rectangular relation in Fig. 17 the upper section 136ᵇ of the platen engages the blank by gripping it against the fixed plate 222 over the area 22 of the blank.

At this point attention is directed to the fact that during the formation of the box body the latch arm 228 is in contact with the latch abutment 226, so as to hold the rod 224 and the plate 222 supported on it, against longitudinal movement. In other words, during the formation of the box body the cross slide 168 slides on the rod 224. It will also be noted that the cross slide 169, which is fixed on the end of the shaft 204 is sliding with the carriage 168 and the platen plates 200 and 202. This action continues until the cam roller 233 engages the extension 228ª on the latch assembly to raise the latch arm 228 out of contact with the latch abutment 226. This action occurs as the box body is completed. The purpose of this latch arrangement is to prevent distortion of the blank which results if the plate 222 is displaced during the formation of the box body B, which will occur unless the latch arrangement is provided.

As the ram continues to move to the right the end walls 24 and 26 and the front wall 28 of the cover are formed because the blank is pushed into the space defined by the cam fingers 160, 162 and 164. Thus the cover C of the box is formed around the portion 136ᵇ of the ram. The cam fingers 160 and 162 are shaped and positioned so that as the ends 24 and 26 of the cover are squeezed flat against the sides of the ram section 136ᵇ, the tabs formed by the slits 24ª and 26ª are pushed out of the plane of the end walls by the presence of the dimples or bosses 136' on each side of the ram. The cam fingers 164 are positioned and shaped so that this displacement of the tabs 24ª and 26ª occurs sufficiently in advance of the folding of the end wall 28ª into position so that the hooked ends of the extensions 28ª and 28ᵇ can pass into the openings formed by the displacement of the tabs 24ª and 26ª. The final position on these hooked ends of the extensions is clearly illustrated in Figs. 17 and 18. The cover is formed against the resistance of spring 238 as will be apparent from a consideration of Fig. 6.

The formation of the box is nearly completed as the ram completes its stroke to the right. The cranks 130 and 126 now begin their return movement carrying the ram 136 back to the left until it reaches the stripper fingers 139 and stripper fingers 141ª and 141ᵇ (there is a corresponding pair on the opposite side of the ram) so that as the ram withdraws within these stripper fingers the box will be displaced from the ram by the engagement of its edges with these fingers. The ram withdraws completely within the stripper fingers, see Fig. 5, so that the box drops down into a receptacle below the machine.

As the ram begins its return stroke, it relieves the pressure on the plate 222 and platen assemblies, including plates 200 and 202 so that the spring 238 causes the shaft 224 and attached parts to move to the left along the fixed rod 236, see Fig. 6.

It will be recalled that during the formation of the body B of the box the platen plate 222 was held fixed and the platen assembly 200 and 202 moved to the right thereof, Fig. 6, with the cross slide 168 sliding on this fixed shaft 224, at the sleeve 168ᵇ and slide 169 sliding on the tubes 40 and 42. These parts will become displaced relatively by approximately a distance equal to the depth of the box body B. The latch finger 228 then releases the platen 222 so that it can move with the slide 168 and plates 200 and 202, until the cover is completely formed. As the ram begins to move back to the left, Fig. 1, the cross slide 168 remains stationary because the lugs 170 and 176 have slid to the right along rods 172 and 174 away from their headed ends. However, as the ram releases its pressure on the plate 202 the cross slide 169 follows the ram under the influence of the springs 40a and 42a in the tubular rails 40 and 42. Thus the platen plate 202 returns with the ram clamping the box body B between them.

As the ram returns from its most forward position back towards the left, the cam rollers 144 or the sides thereof, see Fig. 9, are pivoted from the position shown in Fig. 8 into the position shown in Fig. 9, so that the bell crank levers 140 are rotated into the position shown in that figure. The displacement of the plate 202 with respect to the plate 200 has caused the withdrawal of the flaps 200a and 200b on the plate 200 out of a position to interfere with the movement of the fingers 146, see Fig. 9, into the position shown in that figure, so that the extensions 16a and 16b, on the end walls of the bottom of the box, can be folded into the position shown in Fig. 9, where their terminal extensions 14d and 16d can be snapped into the slots 14c and 16c, so that they will assume the locked position shown in Fig. 18. In other words, the flaps 200a and 200b and the plate 200 on which they are mounted do not follow as the ram begins its return movement, thus they are withdrawn from a position which would interfere with the folding over and locking of the extensions 16a and 14a. This operation is completed by the time the lugs 170 and 176 engage the heads of the rods 172 and 174 which are tied to the slide 168, see Fig. 1, whereupon that slide begins its return movement, pulled by the ram, so as to return to its starting position when the ram is back at its starting position.

Figures 11, 12, 14:
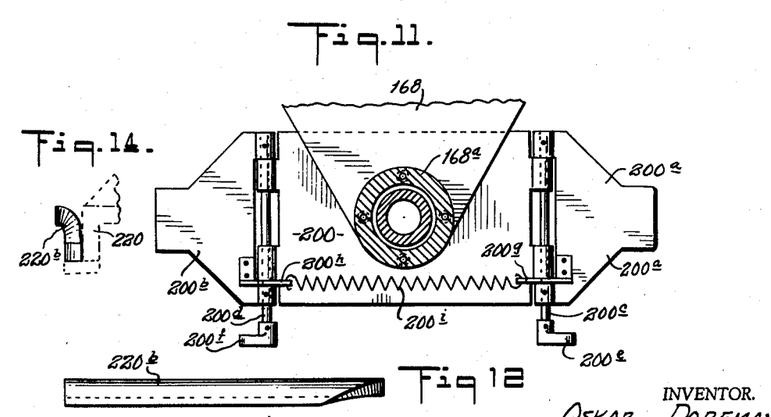
Figure 11 is a similar view of the associated portion.
Figures 12 and 13 are top plan and side elevational views respectively of one of the cams.
Figure 14 is a diagrammatic detailed view illustrating the mounting of the cam of Figures 12 and 13.
Figure 13:
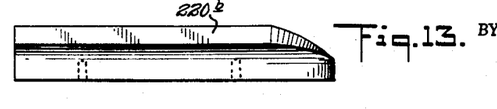

As the platen assembly 200 and 202 returns to normal position the spring loaded rods 214 and 216 will cause the flaps 206 and 208 to return to planar relationship with respect to plate 202. Likewise, the flaps 200a and 200b will be pulled back to their original position by means of the spring 200i, see Fig. 11. Also, the flap extensions 206a and 206b, 208a and 208b will be pulled back to their original position by the related springs 206c, 206d 208c and 208d. All of these springs are rendered effective by reason of the fact that the connected parts are returning along the fixed cams in an action reverse to that which occurred while the box was being formed.

From the above it will be seen how the mechanism disclosed herein operates to automatically form the completed box from the blank 10. Obviously in a machine of this complexity those skilled in the art may make many changes in the details of construction of the parts for performing the operations described. It is preferred, therefore, that the machine disclosed be taken in an exemplary sense and that the scope of protection afforded hereby be determined by the appended claims.

What is claimed is:

1. In a machine for folding a box blank into a box having a body and an integral cover, comprising a reciprocably mounted body forming female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, and a plurality of fixed cams for causing said flap pairs to assume a right angle relation with their supporting plates when engaged and moved by said ram to fold the body portion of the blank to form end and side walls.

2. In the combination of claim 1, extensions hingedly mounted on the ends of one of said flap pairs, and means for moving them into right angle relation with the associated flaps to fold triangular corner tabs integral with the end and side walls of the box body against the outer faces of the end walls.

3. In the combination of claim 1, spring return means for said flap pairs for returning them to normal position as said plates are withdrawn from engagement with said fixed cams.

4. In the combination of claim 2, spring return means for said flap pairs for returning them to normal position as said plates are withdrawn from engagement with said fixed cams, and spring return means for said extensions.

5. In the combination of claim 2, means comprising fingers pivotally mounted on said ram and fixed abutments coacting therewith for folding extensions on said end walls to overlie said folded triangular corner tabs upon the return stroke of said ram.

6. In the combination of claim 2, means comprising fingers pivotally mounted on said ram and fixed abutments coacting therewith for folding extensions on said end walls to overlie said folded triangular corner tabs upon the return stroke of said ram, said ram having recesses adjacent a slit in each end wall of said box, said fingers being formed to insert locking tabs on the back end extensions of said box into slits in the associated end walls.

7. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, and means thereupon actuated to release said last mentioned plate for movement with the ram.

8. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, means thereupon actuated to release said last mentioned plate for movement with the ram, and fixed cams cooperating with said last plate for folding the end wall and front wall portions of the cover into right angle relation.

9. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, means thereupon actuated to release said last mentioned plate for movement with the ram, fixed cams cooperating with said last plate for folding the end wall and front wall portions of the cover into right angle relation, and a spring for resisting the movement on said last plate when the locking means is released.

10. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, and means thereupon actuated to release said last mentioned plate for movement with the ram, said releasing means being actuated by the movement of said pair of plates.

11. In the combination of claim 1, springs for returning the front plate of said pair to its initial position upon the return movement of said ram.

12. In the combination of claim 1, wherein said pair of parallel plates comprises a front plate and a rear plate, springs for returning said front plate of said pair upon the return movement of said ram, and lost motion means for connecting said ram to said back plate to return it to initial position.

13. In the combination of claim 1, means for stripping the box from said ram on its return movement.

14. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, means thereupon actuated to release said last mentioned plate for movement with the ram, fixed cams cooperating with said last plate for folding the end wall and front wall portions of the cover into right angle relation, and rails for supporting said plate pair and said other plate for reciprocable movement.

15. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, means thereupon actuated to release said last mentioned plate for movement with the ram, fixed cams cooperating with said last plate for folding the end wall and front wall portions of the cover into right angle relation, and means for positioning successive blanks between said ram and said plate pair.

16. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, means thereupon actuated to release said last mentioned plate for movement with the ram, fixed cams cooperating with said last plate for folding the end wall and front wall portions of the cover into right angle relation, and means for positioning successive blanks between said ram and said plate pair, including suction cups and a valve for connecting the suction cups to and disconnecting them from a source of suction.

17. In a machine for folding a box blank into a box having a body and an integral cover, comprising a reciprocably mounted body forming a female die composed of a pair of relatively movable parallel plates each having a pair of flaps integrally mounted on an opposite pair of its edges and normally lying in their respective planes, the hinging axes of said plates lying on the sides of a rectangle, a reciprocably mounted male die ram having box body and a cover forming portions, means for causing reciprocation of said ram, a plurality of fixed cams and causing said flap pairs to assume a right angle relation with their supporting plates when engaged and moved by said ram to fold the body portion of the blank to form end and side walls, a reciprocable plate engageable by the cover forming portion of said ram, means for locking said last plate against movement during the folding of the end and side walls of the box body to rectangular relation, means thereupon actuated to release said last mentioned plate for movement with the ram, fixed cams cooperating with said last plate for folding the end wall and front wall portions of the cover into right angle relation, and means for effecting reciprocation of said ram, said plate pair and said other plate.

18. A machine for folding a box blank into a box having a body and an integral cover, comprising a reciprocably mounted body forming female die having a central plate and four flaps hingedly mounted about said central plate, the hinging axes of said flaps lying on the sides of a rectangle, said flaps normally lying in the plane of said central plate, a reciprocably mounted male die ram having box body and cover forming portions, means for causing reciprocation of said ram, a plurality of fixed cams for moving said flaps to right angle relation with said central plate upon said plate being engaged and moved by said ram to fold the body portion of the blank to form end and side walls, a reciprocable plate engageable by the cover forming portion of said ram, means for locking said last plate against movement during the folding of the end and side walls of the box body to rectangular relation, and means thereupon actuated to release said last mentioned plate for movement with the ram.

19. In the combination of claim 1, means for causing said flap pairs to assume simultaneously said right angle relationship upon their respective supporting plates being moved by said ram.

References Cited in the file of this patent

UNITED STATES PATENTS

| | | |
|---|---|---|
| 1,000,991 | Comings | Aug. 22, 1911 |
| 2,604,827 | Hickin et al. | July 29, 1952 |
| 2,655,843 | Baker et al. | Oct. 20, 1953 |
| 2,697,968 | Cote et al. | Dec. 28, 1954 |

FOREIGN PATENTS

| | | |
|---|---|---|
| 462,482 | Canada | Jan. 17, 1950 |